United States Patent [19]

Preukschat

[11] 4,384,692
[45] May 24, 1983

[54] SATELLITE SYSTEM CONFIGURATION

[76] Inventor: A. Werner Preukschat, Dobbelmanduin 2, Noorwijk, Netherlands

[21] Appl. No.: 233,485

[22] Filed: Feb. 11, 1981

[30] Foreign Application Priority Data

Feb. 14, 1980 [FR] France ................................ 8003247

[51] Int. Cl.³ .......................... B64G 1/00; B64G 1/64; B64G 1/44
[52] U.S. Cl. ............................... 244/158 R; 244/161; 244/173
[58] Field of Search ............... 244/158, 159, 161, 164, 244/171, 173

[56] References Cited

U.S. PATENT DOCUMENTS 3,781,647 12/1973 Glaser .................................. 244/159

OTHER PUBLICATIONS

John Overall, Jr., "25 kw Power Module Evolution Study", Proceedings of 14th Intersociety Energy Conversion Conf., Aug. 1979, pp. 1231-1236.
Bernard Raab, "... Dynamic Isotope Power System for Spacecraft", 15th Intersociety Energy Conversion Conf., Aug. 1980, pp. 1020-1025.

Primary Examiner—Charles E. Frankfort
Attorney, Agent, or Firm—McCormick, Paulding & Huber

[57] ABSTRACT

A new satellite system configuration is comprised of a power module with rigidly attached solar arrays and a control module including a sun pointing unit, an earth pointing unit and a rotary interface. The power module is attached to one face of the sun pointing unit and an opposite face of the sun pointing unit is attached to the earth pointing unit through the rotary interface to allow the earth pointing unit to remain pointing to the earth while the sun pointing unit rotates relative to it to keep the rigidly attached solar arrays of the power module pointing toward the sun. The earth pointing unit has a docking area for subsequent orbital docking of one or more earth pointing payload satellites to be serviced and controlled by the power and control modules.

3 Claims, 5 Drawing Figures

SATELLITE SYSTEM CONFIGURATION

BACKGROUND OF THE INVENTION

The present invention relates to a new Satellite Configuration for geostationary missions.

Conventional satellite configurations consist of self contained units which include all service function elements that are required by the specific mission payload as well as the payload itself. In view of satellite reliability and service availability considerations sufficient on-board redundancy needs to be achieved to meet the life time mission requirements. Due to the mass limitation of some launch vehicles, the redundancy requirement leads to the adoption of satellite systems that require, for example for a 10 year service life, the procurement a number of individual flight satellites and their launch with a primary and a spare operational satellite always in orbit, and at least one spare satellite on the ground.

Typical disadvantages of the conventional multisatellite system are:

(a) High satellite and launch costs due to the number satellites required, (b) The satellite systems are complex due to the effort of maximizing single satellite mission usefulness constrained by mass limitations of the launch vehicle, (c) There is a high orbit occupancy, for example of geostationary orbit positions, for a single mission service, (d) High operational costs due to the monitoring and control of two in-orbit satellites for each system, (e) Danger of interference between the growing number of satellites around desired or allocated orbit positions.

The problem to be solved is to provide a geostationary satellite configuration which at the same time meets mission requirements and overcomes the mass limitations of the launch vehicle.

SUMMARY OF THE INVENTION

The object of the invention is a new satellite system configuration which solves the above mentioned problem.

In accordance with this invention, the new configuration basically comprises a service satellite which includes all the power and functional control equipment, and a plurality of payload satellites sharing in common the service satellite functional equipment, said payload satellites being docked separately in orbit either directly to the service satellite or to the already orbiting satellite assembly.

The service satellite is comprised of at least one power module having solar arrays rigidly attached thereto and a control module comprising a sun pointing unit attached to the power module, an earth pointing unit and a rotary interface part interfacing the sun pointing unit and the earth pointing unit, the latter unit having at least one docking face provided with attachment means for docking at least one payload satellite thereto.

The service satellite according to the invention permits realization of a satellite system assembly having a three-leg string or Y configuration, one leg comprising the service satellite and each of the other two legs comprising at least one payload satellite with its associated transfer orbit and docking satellite.

A first advantage of the proposed solution is that it meets its objective of overcoming present and near future mass limitations imposed by some launch vehicles, and that it thus allows the cost-effective establishment of any typical 10-year operational system with a single payload satellite without the need for other satellites to be launched or to use a higher-mass-capability launch vehicle.

A second advantage derived from the Service Satellite concept is to share commonly required service for several Payload Satellites simultaneously thereby reducing investment cost of system operation for the corresponding subsequent operational services.

A third advantage obtained from this concept of the Service Satellite system is that it allows multiple but otherwise independent payloads to be launched separately and then docked in orbit for being serviced by a common Service Satellite.

Other advantages include reduction of otherwise required orbit positions and the possibility to avoid interferences between satellites which is of particular importance to the establishment of the future planned TV satellite systems.

DESCRIPTION OF AN EXEMPLARY EMBODIMENT

Figure 1:
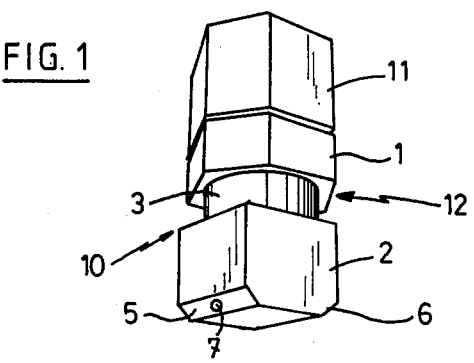
FIG. 1 is a schematic perspective view of a service satellite according to the invention, with solar arrays undeployed.
Figure 2:
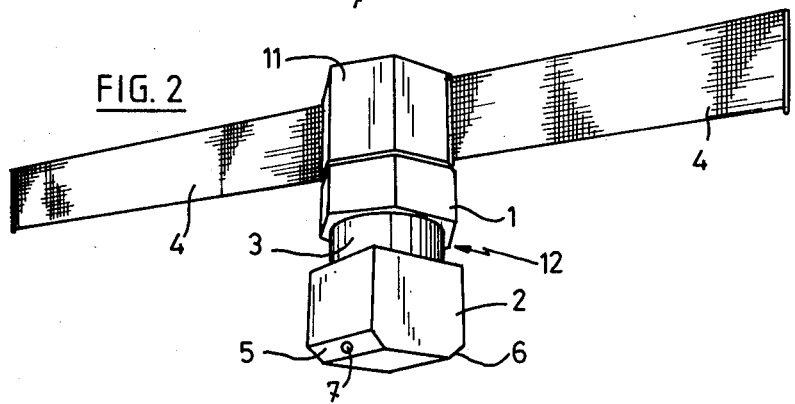
FIG. 2 shows the satellite of FIG. 1, with solar arrays deployed.

Referring to FIG. 1 there is shown the basic service satellite configuration in accordance with the invention with solar arrays undeployed. FIG. 2 shows the same satellite with solar arrays deployed. The service satellite 10 as shown comprises a power module 11 with rigidly attached solar arrays 4 and a main control module 12 including the functional subsystems required to perform all the necessary controls to meet the desired mission and lifetime requirements.

The power module 11 includes for instance the following functional subsystems: energy storage for provision of eclipse power to the assembly; power conditioning electronics for the control of balanced power generation, energy system charging and discharging, and generation of assembly power in suitable form for distribution; attitude disturbance reaction system for cancellation of solar disturbance torques to the assembly (electric propulsion thruster system); and thermal control facilities for thermal dissipation control via module side walls shadowed by the deployed solar array.

Figure 4:
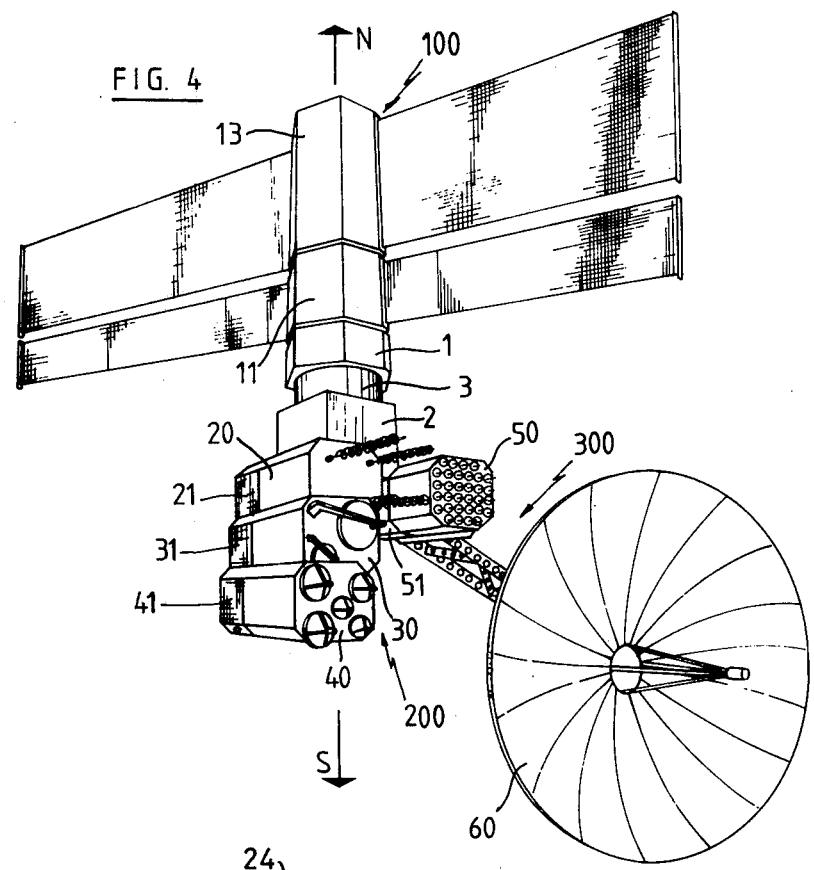
FIG. 4 depicts a typical example of a satellite system configuration in accordance with the invention.

Additional power modules can be docked to the north face of the service satellite as will be seen hereinafter with reference to the embodiment as illustrated in FIG. 4.

The main control module 12 includes the functional subsystems required for performing all the necessary controls to meet the desired service mission objectives and life in geostationary orbit. The functional subsystems include for instance: attitude and orbit control electronics; reaction elements for orbit and attitude control; tracking, telemetry and processing electronics; docking adaptors; and docking monitoring and control instrumentation.

The main control module 12 is comprised of three parts: a sun-pointing unit 1, an earth-pointing unit 2 and rotary interface means 3 interfacing the units 1 and 2. The sun-pointing unit 1 is fixed by a first face to the power module 11 and it is arranged to be kept pointing to the sun. The earth-pointing unit 2 is intended to be kept pointing to the earth and for this purpose it is attached by a first face to the south face of unit 1 through the rotary interface means 3 which consists in a bearing arrangement with passages for the energy supply and control data transfer connections in order among others to maintain unit 2 continuously pointing to the earth. The earth-pointing unit 2 is provided with one or several faces arranged for docking payload satellites. In the exemplary embodiments illustrated in the drawings, unit 2 has two docking faces 5 and 6 forming an angle of 45° therebetween, which allows the system to be realized in a configuration which is advantageous for radiation of waste heat and avoidance of shadowing of the solar panels 4. The docking faces 5 and 6 are provided with attachment means 7 which may consist in various types of devices known in the art and described in the literature.

Maintenance of the Service Satellite 10 in orbit, if desired, is achieved by additional docking of a second Service Satellite to the North or South face, or one or more additional power modules docked to the initial Service Satellite 10.

Figure 3:
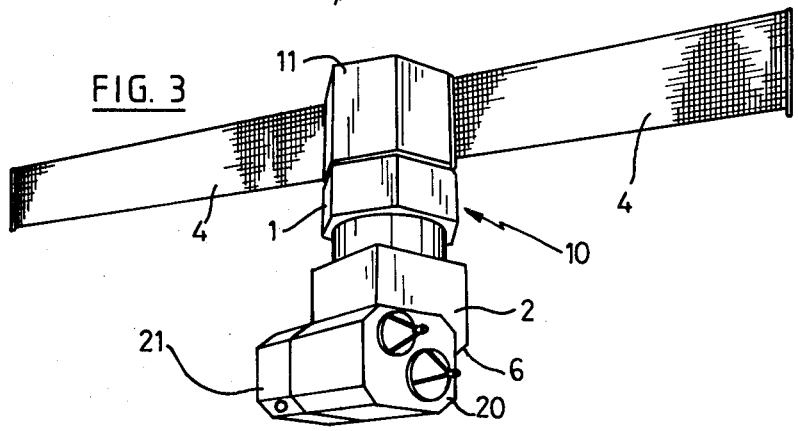
FIG. 3 shows the service satellite of FIG. 2 with a payload satellite docked thereto.

Assembling the satellite system proceeds in the following way. The service satellite 10 is first launched and positioned at the final, desired geostationary orbit position. Afterwards, a payload satellite with its usual transfer orbit and docking satellite is launched and placed by separate ground station control into an initial position in geostationary orbit. Let the payload satellite be denoted 20. Rendezvous and docking of this payload satellite 20 with the service satellite 10 is then performed under monitor and control of a ground station via the service satellite 10 and the associated transfer orbit and docking satellite. The assembly thus achieved is illustrated on FIG. 3. The payload satellite 20 is docked to the unit 2 of the Service Satellite 10 through its transfer orbit and docking satellite 21. The latter is a device known per se which is launched with the payload and serves also as an interface means between the payload satellite and its launch vehicle. As usual, the satellite 21 includes all the equipment needed for carrying the payload satellite 20 into its position in orbit, for performing rendezvous with the service satellite 10 under the control of the ground station via the service satellite 10 and for providing the necessary interface between the payload and the service satellite.

Figure 5:
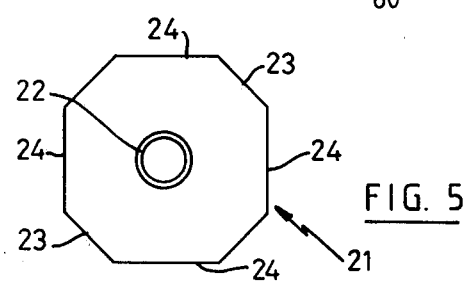
FIG. 5 is an elevational view of the transfer orbit and docking satellite associated to a payload satellite.

The structure of satellite 21 is schematically depicted in FIG. 5 which is an end view. The visible face is that one which serves for the attachment of the payload, it being provided with a docking adaptor 22 for attachment of the payload satellite. The opposite face is provided with a docking adaptator for attachment to the launch vehicle. The internal structure comprises a central tube with ribs and panels for supporting various equipments. The central tube is also part of the liquid propellant tanks for the apogee boost motor/reaction control system. The external structure of satellite 21 advantageously has a section of square geometry with corners cut away at 45° to provide faces 23 for mounting the docking adaptors. The faces 24 carry for instance solar panels to provide the required energy for operation in the transfer orbit, in sun-pointing mode. Energy storage and supply is performed through electro-chemical batteries.

Referring back to FIG. 3, one payload satellite 20 is seen to be docked to face 5 of the service satellite 10 in accordance with the invention. Additional payloads can be docked the same way in orbit to the service satellite 10 for being serviced from the latter. Unit 2 of control module 12 in FIG. 3 has a second docking face 6 which permits a payload satellite to be docked thereto as is the payload 20 to the docking face 5. Further, one or several other payloads can be docked successively to the payloads of the already orbiting assembly, each payload satellite being separately docked to the already orbiting assembly and all these payloads being serviced and controlled from the common service satellite 10. FIG. 4 depicts schematically a typical assembly configuration in accordance with this invention. In this example, the service satellite 10 comprises two power modules 11 and 13 for providing the energy supply to the satellite assembly. The earth pointing unit 2 of the service satellite 10 has a plurality of payloads docked thereto, viz. payloads 20, 30, 40, 50, 60 each payload having obviously its usual transfer orbit and docking satellite (21, 31, 41, 51) associated to it.

It is apparent from FIG. 4 that the satellite assembly according to the invention forms a typical three-leg string or Y configuration. The unit 2 of the control module 12 forms the common mode of configuration. The first leg 100, i.e. the north-south leg, comprises the service satellite 10 and possibly the additional service modules which can be docked to the north face of the service module 10. The other two legs 200, 300 comprise the payload satellites 20, 30, 40, 50 and 60 which are docked to each other through their respective transfer orbit and docking satellites as described earlier.

In the illustrated embodiment, the satellite 20 represents an UHF payload and the satellites 30 and 40 represent general telecommunications satellites (telephony, data transmission, TV distribution). The satellite 50 is also docked to the control module 12 of service satellite 10 and the satellite 60 is docked to payload satellite 50, always through their respective transfer orbit and docking satellites. In the example depicted, satellite 50 represents a mobile telecommunications satellite and satellite 60 represents a data relay satellite.

The advantage of the satellite configuration in accordance with this invention is that it can be assembled in orbit by separately docking each payload satellite to either the service satellite 10 of the invention, or the already orbiting assembly, with the advantageous resulting consequences as explained earlier herein.

It is to be understood that the illustrative embodiments described hereinbefore and depicted in the appended drawings are only a few examples serving to illustrate the principle of the configuration in accordance with the invention.

What is claimed is:

1. Satellite system configuration comprising a service satellite (10) including at least one power module (11) having solar arrays rigidly attached thereto, and a control module (12) comprised of a sun pointing unit (1) attached at a first face thereof to one side of the power module, and an earth pointing unit (2) attached at one side to a second face of the sun pointing unit through rotary interface means (3) arranged to allow said earth pointing unit to remain pointing to the earth while said power module and solar arrays are kept pointing to the sun, said earth pointing unit having at least a second side (5) provided with docking means (7) for subsequent docking in orbit of at least one earth pointing payload satellite (20) for being serviced and controlled from said service satellite (10).

2. A satellite system configuration according to claim 1, comprising three string legs having a common point, the first leg (100) including the service satellite (10) with said earth pointing unit (2) thereof providing the common point, the other two legs (200, 300) each including at least one earth pointing payload satellite (20,50) docked to said earth pointing module (2).

3. A satellite system configuration according to claim 2, wherein at least one of said other two legs includes a plurality of earth pointing payload satellites (20,30,40;50,60) docked to each other.

* * * * *